United States Patent
Elofson et al.

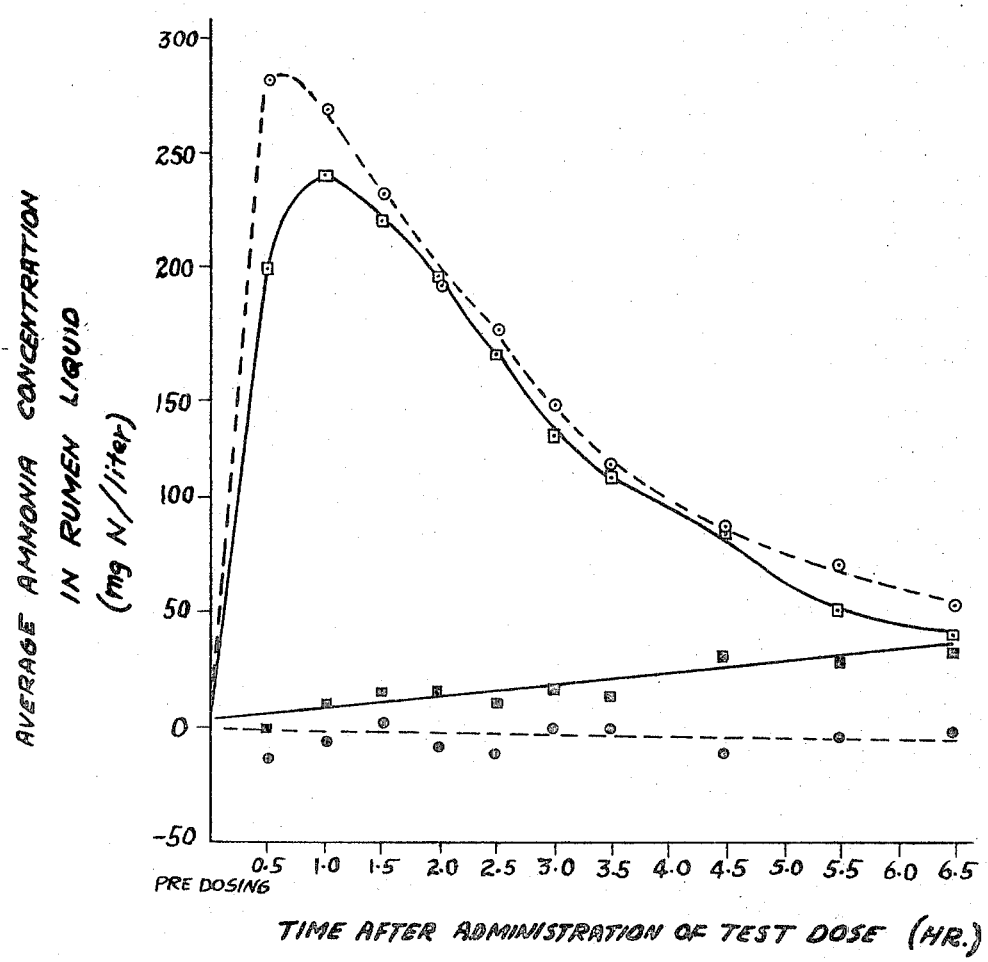

[11] 3,843,799
[45] Oct. 22, 1974

[54] METHOD OF FEEDING RUMINANTS N-GLUCOSYL-N'-HYDROXYMETHYLUREA

[75] Inventors: Richard MacLeod Elofson; Larry Patrick Milligan; Jurgen Wohllebe; Michael Worsley, all of Edmonton, Alberta, Canada

[73] Assignee: The Research Council of Alberta, Edmonton, Alberta, Canada

[22] Filed: Jan. 26, 1973

[21] Appl. No.: 327,206

[52] U.S. Cl.................. 426/2, 426/69, 426/807, 424/180
[51] Int. Cl............................................. A23k 1/22
[58] Field of Search.............. 99/2 ND, 2 R, 6, 5; 260/211.5 R, 553 R; 424/180; 426/2, 69, 807

[56] References Cited
UNITED STATES PATENTS

| | | |
|---|---|---|
| 2,596,268 | 5/1952 | Meijer.................. 260/211.5 R |
| 3,677,767 | 7/1972 | McNeff................................ 99/6 |
| 3,684,518 | 8/1972 | Wortham.............................. 99/6 |

*Primary Examiner*—Wilbur L. Bascomb, Jr.
*Assistant Examiner*—Curtis C. Ribando
*Attorney, Agent, or Firm*—Millen, Raptes & White

[57] ABSTRACT

N-glucosyl-N'-hydroxymethylurea, having the structual formula

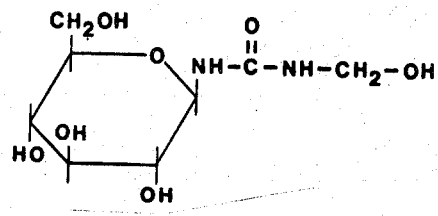

is shown to be useful as a feed supplement for ruminants.

1 Claim, 1 Drawing Figure

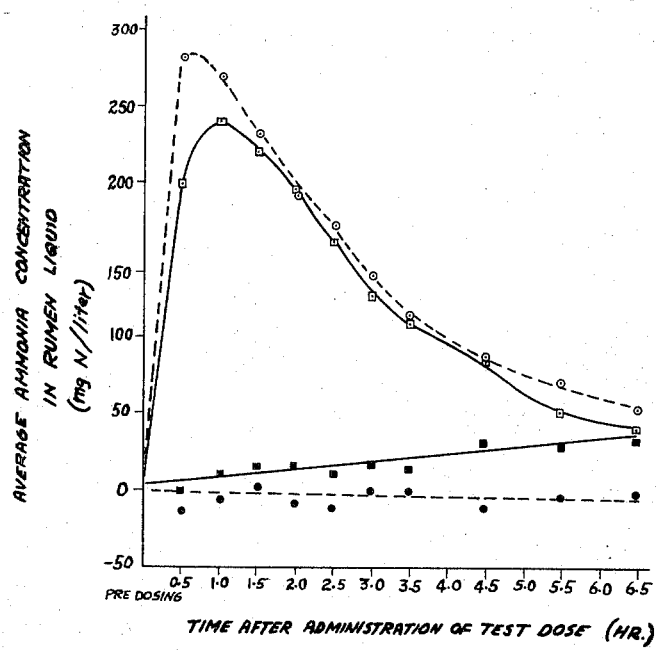

METHOD OF FEEDING RUMINANTS N-GLUCOSYL-N'-HYDROXYMETHYLUREA

BACKGROUND OF THE INVENTION

This invention relates to a method for supplementing the nitrogen intake of a ruminant and to a novel composition useful for this purpose.

In recent years, urea has been used as a dietary supplement in the feeding of ruminants. The compound is hydrolyzed, by the microorganisms present in the rumen of the animal, to produce ammonia. Some of this ammonia is absorbed into the blood stream of the animal and some is used as a source of nitrogen in the production of cellular protein.

In the context of a feed supplement for ruminants, urea is characterized by a shortcoming which limits its use in this field. More specifically, the rumen microorganisms convert the urea to ammonia at too rapid a rate. As a result, much of the ammonia produced is absorbed into the animal's blood stream and is converted back to urea in the liver and excreted. The benefit of the contained nitrogen is thereby lost. In addition, the ammonia which is absorbed is taken in at such a rate that it may prove toxic to the animal.

SUMMARY OF THE INVENTION

It is therefore desirable and the object of this invention to provide a ruminant feed supplement composition, the active ingredient of which is converted to ammonia by the rumen microorganisms at a relatively slow rate, whereby the ruminant is able to efficiently assimilate nitrogen from it without toxic side effects. It is a further object to provide an improved method for feeding ruminants with a non-protein source of nitrogen.

In accordance with the invention we have discovered that the compound N-glucosyl-N'hydroxymethylurea, characterized by the structural formula

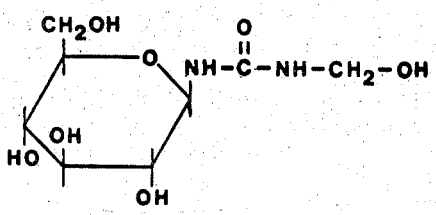

is useful when fed to a ruminant, since the animal can retain a surprisingly large amount of the nitrogen contained in the compound and convert this nitrogen to protein, as evidenced by weight gain.

The invention comprises the method for supplementing the nitrogen intake of a ruminant which comprises feeding it N-glucosyl-N'-hydroxymethylurea.

FIG. 1 shows the average patterns of change in ammonia concentration in the rumen fluid following administration of urea, or of N-glucosyl-N'-hydroxymethylurea, during tests conducted over five weeks (Curve 1, sheep 1, urea; Curve 2, sheep 2 urea; Curve 3, sheep 1, N-glycosyl-N'-hydroxymethyl-urea; Curve 4, sheep 2, N-glucosyl-N'-hydroxymethylurea). Each curve represents the average of six, weekly tests.

The following examples illustrate how the compound can be produced, and describe its performance as a dietary supplement in ruminant feed.

EXAMPLE I

This example illustrates how the compound can be produced from pure glucose.

A stirred mixture of 1 kg. of glucose hydrate and 1 kg. of urea in 500 ml. of 5 percent aqueous sulfuric acid was heated at 70°C for 18 hours. Further 500 ml. of 5 percent sulfuric acid was added and heating continued at 70°C for additional 24 hours. The reaction mixture was refrigerated for 2 days, and the crystals formed triturated with methanol, then filtered and air-dried to give 620 g. of N-glucosylurea-urea adduct. Concentration of the mother liquor gave an additional 297 g. of the product. The total yield was 917 g. (64.5 percent of theoretical). The combined product fractions were extracted seven times with 1.5 l. portions of boiling methanol to give 632 g. (57 percent yield) of N-glucosylurea, melting point 212°–214°

To C. To a solution of 22.2 g. of N-glucosylurea and 15 ml. of 40 percent aqueous formaldehyde solution in 30 ml. of water was added sufficient 5 percent aqueous sodium hydroxide solution to bring the reaction mixture to pH 9. The solution was stirred at room temperature for 4 hours, kept refrigerated overnight, and then concentrated at water aspirator pressure to a syrup, which was diluted with 200 ml. of methanol and then refrigerated. The solids formed (16 g.) were filtered and repeatedly recrystallized from aqueous methanol to give pure N-glucosyl-N'-hydroxymethylurea.

EXAMPLE II

This example illustrates how blackstrap molasses can be used to produce a composition comprising the compound N-glucosyl-N'-hydroxymethylurea and a carrier, fructose, which is palatable to ruminants.

A mixture of 2.5 kg. of blackstrap molasses (57 percent total sugar content) and 300 g. of urea was treated with a solution of 70 ml. of 85 percent phosphoric acid and 70 ml. of concentrated sulfuric acid in 300 ml. of water, then heated at 60°C with stirring for 15 hours. After cooling the reaction product to room temperature, 200 g. of slaked lime was added, followed by 500 g. of a 37 percent aqueous formaldehyde solution and sufficient 30 percent aqueous sodium hydroxide solution to bring the reaction mixture to pH 9.

N-glucosylurea and N-glycosyl-N'hydroxymethylurea were identified in the molasses products by comparative paper chromatography, using Whatman No. 1 paper as the stationary phase, and a mixture of butanol, pyridine, and water (9:5:4) as the mobile phase.

EXAMPLE III

The accumulation of ammonia following administration of N-glucosyl-N'-hydroxymethylurea into the rumen of sheep and the possibility of adaptation of the rumen population to the degradation of N-glucosyl-N'-hydroxymethylurea were examined using two sheep of approximately 50 kg. body weight fitted with rumen cannulae, by procedures similar to those described in a paper by Atwal, Young and Milligan, published in the Canadian Journal of Animal Science, 51: 544–546. The animals were maintained on a full voluntary intake of good quality bromegrass-fescue hay (9.2 percent crude protein) which was offered morning and evening except on test days, when feed was not provided until after the final rumen samples were taken. Water was provided in a bowl in the metabolism crate as was the mineral mixture (equal parts by weight of cobalt iodized salt and of bonemeal). The induction dose consisted of 3 g. of nitrogen as N-glucosyl-N'-hydroxymethylurea which was administered daily on two equal portions in the morning and evening through the rumen cannula. On test days, the morning administration of the induction dose was ommitted. The test dose of a non-protein nitrogen source was 3 g. of nitrogen. Each week, for five weeks, each sheep was tested on sequential days for ammonia accumulation from N-glucosyl-N'-hydroxymethylurea and from urea, the latter serving as the reference. During the sixth week each sheep was given 6 g. of nitrogen as N-glucosyl-N'-hydroxymethylurea daily and no tests were conducted.

During the seventh and eighth weeks, nitrogen balance studies were conducted on the two sheep and tests of ammonia accumulation were not conducted. The methods and procedures for the nitrogen balances were as described in the paper by Milligan et al., published in the Canadian Journal of Animal Science, 49: 135–141. Complete excreta collections were conducted during the final four days of the seventh and eighth weeks. During this time the hay intakes of the sheep were strictly standardized; sheep 1 consumed 1500 g. per day while sheep 2 consumed 1200 g. per day. Six grams of nitrogen as N-glucosyl-N'-hydroxymethylurea was administered through the cannula in two equal portions daily to each sheep during the seventh week. During the eighth week the sheep received no supplemental source of nitrogen.

The ammonia concentrations in the rumen following testing with N-glucosyl-N'-hydroxymethylurea over five weeks of induction are presented in Table I.

The average patterns of change of ammonia concentration in the rumen during the in vivo tests of ammonia release with N-glucosyl-N'-hydroxymethylurea and with urea are presented in FIG. 1. The patterns of ammonia accumulation following administration of N-glucosyl-N'-hydroxymethylurea did not show any consistent change, or trend, during the 5 weeks (Table I). Similarly, the urea patterns did not change during the induction study and are consistent with previous results using urea (Atwal, Young and Milligan, supra).

It is clear (Table I, FIG. 1) that ammonia concentrations did not notably change from endogenous levels as a result of administration of N-glucosyl-N'-hydroxymethylurea into the rumen and there was no evidence that there was adaptation of the rumen population to result in rapid degradation of N-glucosyl-N'-hydroxymethylurea. Adaptation to other compounds had been noted previously (Atwal, Young and Milligan, supra). There was rapid, massive accumulation of ammonia following administration of urea. Clearly, N-glucosyl-N'-hydroxymethylurea was not degraded at a rate even comparable to that of urea, or at a rate that substantially exceeded the inherent capacity of the animals to maintain endogenous concentrations of ammonia in the rumen. This is a desirable property of a slow-release non-protein nitrogen source. In addition, it is clear that the danger of causing ammonia toxicity as a result of using N-glucosyl-N'-hydroxymethylurea as a non-protein nitrogen supplement would be very much less than that with urea. The N-glucosyl-N'-hydroxymethylurea caused no deleterious effects on the sheep.

The data of the nitrogen balance studies are presented in Table II.

Table II

Quantities (g) of nitrogen excreted during 4-day periods with (24 g supplemental nitrogen per sheep during the period) and without supplementation of N-glucosyl-N'-hydroxymethylurea. (all values are the average of results from two sheep)

| Period | Urinary nitrogen | Fecal nitrogen |
|---|---|---|
| With supplementation | 51.29 | 36.36 |
| Without supplementation | 37.57 | 32.08 |
| Difference | 13.72 | 4.28 |

When 24 g of nitrogen as N-glucosyl-N'-hydroxymethylurea were provided, there was an increased fecal nitrogen output of 4.28 g or 17.8 percent of that provided. Thus 82.2 percent of the nitrogen provided as N-glucosyl-N'-hydroxymethylurea was apparently absorbed from the digestive tract. The increased urinary excretion of nitrogen as a result of provision of 24 g of nitrogen as N-glucosyl-N'-hydroxymethylurea was 13.72 g, or 57.2 percent of that provided. Thus 82.2 percent of the nitrogen of N-glucosyl-N'-hydroxymethylurea was absorbed and 57.2 percent was excreted in the urine indicating that (82.2% − 57.2%) 25.0%, or 6 g, of the nitrogen of N-glucosyl-N'-hydroxymethylurea was retained in the body, presum- Table I Concentration of ammonia in the rumen contents of sheep during in vivo tests of ammonia accumulation over the induction period*

| Time on induction treatment (weeks) | Sheep | Time after administration of test dose (hours) | | | | | | | | | |
|---|---|---|---|---|---|---|---|---|---|---|---|
| | | −0.5 | 0.5 | 1.0 | 1.5 | 2.0 | 2.5 | 3.0 | 3.5 | 4.5 | 5.5 | 6.5 |
| 0 | 1 | 52 | 96 | 100 | 112 | 116 | 76 | 124 | 124 | 124 | 124 | 108 |
|   | 2 | 132 | 120 | 112 | 124 | 112 | 96 | 112 | 108 | 112 | 120 | 80 |
| 1 | 1 | 106 | 116 | 106 | 102 | 96 | 102 | 96 | 82 | 116 | 102 | 116 |
|   | 2 | 106 | 92 | 102 | 106 | 92 | 98 | 98 | 100 | 66 | 102 | 108 |
| 2 | 1 | 76 | 82 | 100 | 86 | 100 | 94 | 98 | 80 | 88 | 102 | 100 |
|   | 2 | 88 | 86 | 70 | 86 | 100 | 86 | 70 | 100 | 96 | 86 | 96 |
| 3 | 1 | 92 | 76 | 100 | 114 | 120 | 110 | 124 | 140 | 152 | 144 | 140 |
|   | 2 | 124 | 106 | 110 | 120 | 112 | 102 | 132 | 132 | 142 | 140 | 132 |
| 4 | 1 | 196 | 196 | 198 | 230 | 210 | 196 | 220 | 206 | 234 | 208 | 240 |
|   | 2 | 184 | 162 | 184 | 164 | 184 | 184 | 200 | 204 | 168 | 180 | 196 |
| 5 | 1 | 180 | 132 | 156 | 156 | 164 | 184 | 146 | 160 | 180 | 194 | 200 |
|   | 2 | 102 | 94 | 118 | 146 | 94 | 110 | 132 | 102 | 102 | 104 | 130 |

*Values are mg ammonia nitrogen/liter rumen fluid.

ably as protein. The N-glucosyl-N'-hydroxymethylurea had an excellent digestibility (greater than 80 percent) and nitrogen from it was utilized in the body of the sheep and retained.

EXAMPLE IV

A feeding trail that would allow assessment, in terms of body weight gain, of effectiveness of N-glucosyl-N'-hydroxymethylurea as a non-protein nitrogen (NPN) supplement for lambs fed hay of low protein content was undertaken.

Experimental

Hay: The hay was predominantly bromegrass and contained 8.9 percent crude protein on an air dry basis.

Barley: The barley contained 9.6 percent crude protein on an air-dry basis.

Minerals: The lambs were allowed free access to a mixture of 1 part by weight of trace-mineralized salt and 1 part by weight of dicalcium phosphate.

Vitamins: All lambs were given vitamins A (1,000,000 I.U.) $D_3$ (150,000 I.U.) and E (100 I.U.) by intramuscular injection at two-month intervals.

Non-Protein Nitrogen Supplements:

Urea:

Feed grade urea (45 percent nitrogen) was dissolved up to three days before feeding in tap water to yield a solution containing 124 g of urea per 1,000 g solution. The solution was held at barn temperature.

Pure N-glucosyl-N'-hydroxymethylurea:

Pure N-glucosyl-N'-hydroxymethylurea (10.8 percent nitrogen) was dissolved in tap water up to three days before feeding to yield a solution containing 321.5 g of solute per 1,000 g of solution. The solution was held at barn temperature.

N-glucosyl-N'-hydroxymethylurea prepared from molasses:

N-glucosyl-N'-hydroxymethylurea was prepared in crude form from liquid, cane molasses. The ensuing syrup contained 34.7 g of nitrogen per 1,000 g and was stored at 4C before using.

1-glucosyl-urea, prepared from molasses:

1-glucosyl-urea was prepared in crude form from liquid, cane molasses. The ensuing syrup was diluted with tap water to contain 34.7 g of nitrogen per 1,000 g and was held at barn temperature before using.

Animals and Management:

Thirty-four crossbred wether lambs were purchased locally, identified with ear tags and housed in a Metabolic Research Unit. The lambs were all drenched with an anthelmintic, vaccinated with combined clostridial bacterin-toxoid and sprayed with a toxaphene insecticide. Feed and water was not removed before the weighings at two-week intervals. The initial weight was considered to be the average of weighings on three consecutive days. Thirty of the lambs were allotted, on the basis of initial weight, to five lots of six animals per lot such that the average animal weight in each lot was equalized. All animals were allowed the hay, in cut (5 cm.) form, free-choice and from day 42 each lot was provided with 681 g of rolled barley at 0830 hours. The animals were housed in the Metabolic Research Unit in one pen per lot at approximately 16 C, were provided with shavings for bedding, had water available at all times and were fed using a bunk along the end of each pen.

The treatments were as follows:

Lot 1. The N-glucosyl-N'-hydroxymethylurea prepared from molasses was provided to this group at the rate of 250 g of syrup per 1,000 g of hay consumed to a maximum daily provision of 1,000 g of syrup to the lot. After having reached the maximum NPN intake, hay was still provided free-choice. The NPN solution was mixed with the hay at least 12 hours before feeding.

Lot 2. The 1-glucosyl-urea prepared from molasses was mixed and fed to this lot in the same manner as the NPN for Lot 1.

Lot 3. The pure N-glycosyl-N'-hydroxymethylurea solution was mixed and fed to this lot in the same manner as the NPN for Lot 1.

Lot 4. The urea solution was provided to this group at the rate of 100 g of solution per 1,000 g of hay consumed to maximum daily provision of 621 g of solution to the lot. When, and if, maximum NPN intake is achieved, hay will still be provided free-choice. The solution was mixed with the hay as for Lot 1.

Lot 5. This group was not provided with any supplemental nitrogen.

Results:

No difficulties were encountered in dispersing the NPN solutions on the hay and there was no indication by the lambs of rejection, or refusal to consume, any of the NPN supplements. In addition, there were no indications of undesirable effects on the health of the animals.

Preliminary (70 day) results for body weight gains and hay consumption are presented in Table III.

Provision of N-glucosyl-N'-hydroxymethylurea prepared from molasses did, at 70 days of feeding, result in a very substantial increase of more than 70 percent in total weight gain over the groups receiving 1-glucosyl-urea from molasses, or urea, as NPN supplements and over the control group receiving no supplemental nitrogen. The pure N-glucosyl-N'-hydroxymethylurea improved by more than 40 percent of the weight gain over the groups receiving 1-glucosyl-urea prepared from molasses, urea, or no supplemental nitrogen, but the gain of Lot 3 was 5.5 kg, or 16 percent less than the group receiving N-glucosyl-N'-hydroxymethylurea prepared from molasses. The provision of N-glucosyl-N'-hydroxymethylurea prepared from molasses increased the consumption of hay by 16 kg over that of the unsupplemented control group. Provision of pure N-glucosyl-N'-hydroxymethylurea did not significantly change hay consumption, while 1-glucosyl-urea prepared from molasses and urea tended to decrease the consumption of hay.

The present results clearly indicate the effectiveness of N-glycosyl-N'-hydroxymethylurea and of N-glucosyl-N'-hydroxymethylurea prepared from molasses as NPN supplements for lambs fed hay of low protein content, as both preparations resulted in improvement in the rate of body weight gain, and improvement in the amount of gain achieved per unit of hay consumed. Neither preparation decreased hay consumption and, in fact, the N-glucosyl-N'-hydroxymethylurea from molasses appeared to increase hay consumption. The present results would indicate that 1-glucosyl-urea prepared from molasses and urea were not effective as NPN supplements for lambs fed hay of low protein content.

Table III

Growth and hay consumption of lambs at 70 days

| Treatment | Lot 1<br>N-glucosyl-N'-hydroxy-methylurea from molasses | Lot 2<br>1-glucosyl-urea from molasses | Lot 3<br>Pure N-glucosyl-N'-hydroxymethylurea | Lot 4<br>urea | Lot 5<br>no supplemental nitrogen |
|---|---|---|---|---|---|
| Average initial weight per lamb (kg) | 17.9 | 17.8 | 18.5 | 18.1 | 18.7 |
| Total weight gain of lot at 70 days (kg) | 33.6 | 19.2 | 28.1 | 18.6 | 19.5 |
| Total hay consumption of lot at 70 days (kg) | 254 | 225 | 239 | 229 | 238 |

What is claimed is:
1. A method for supplementing the nitrogen intake of a ruminant which comprises:
feeding it N-glucosyl-N'-hydroxymethylurea.

* * * * *